(12) United States Patent
Isaksson et al.

(10) Patent No.: US 6,993,068 B1
(45) Date of Patent: Jan. 31, 2006

(54) METHOD FOR ESTIMATING AND SYNCHRONIZING FRAME BOUNDARIES OF MIS-ALIGNED CROSS-TALK SIGNALS IN A DMT SYSTEM

(75) Inventors: Mikael Isaksson, Lulea (SE); Lennart Olsson, Lulea (SE); Denis Julien Gilles Mestdagh, Saint Martin D'Uriage (FR)

(73) Assignees: STMicroelectronics NV, Amsterdam (NL); STMicroelectronics S.A., Gentilly (FR)

( * ) Notice: Subject to any disclaimer, the term of this patent is extended or adjusted under 35 U.S.C. 154(b) by 590 days.

(21) Appl. No.: 09/686,031

(22) Filed: Oct. 11, 2000

(30) Foreign Application Priority Data

Oct. 13, 1999 (EP) .................................. 99850150

(51) Int. Cl.
*H04B 1/38* (2006.01)
(52) U.S. Cl. .................. 375/222; 375/260; 379/399.01
(58) Field of Classification Search ................ 375/222, 375/260, 298, 354; 370/207, 503; 379/399.01; 708/426, 422; 329/399.01
See application file for complete search history.

(56) References Cited

U.S. PATENT DOCUMENTS

| 5,668,802 | A | 9/1997 | Chalmers | 370/276 |
| 5,812,523 | A | 9/1998 | Isaksson et al. | 370/208 |
| 6,134,283 | A * | 10/2000 | Sands et al. | 375/354 |
| 6,178,025 | B1 * | 1/2001 | Hardcastle et al. | 398/17 |

FOREIGN PATENT DOCUMENTS

| EP | 0 917 315 | 5/1999 |
| WO | WO 97/06619 | 2/1997 |
| WO | WO 99/43123 | 8/1999 |

OTHER PUBLICATIONS

European Search Report from European patent application No. 99850150, filed Oct. 13, 1999.

* cited by examiner

*Primary Examiner*—Young T. Tse
*Assistant Examiner*—Edith Chang
(74) *Attorney, Agent, or Firm*—Lisa K. Jorgenson; William R. McClellan; Wolf, Greenfield & Sacks, P.C.

(57) ABSTRACT

In a telecommunications transmission system using a DTM system as a multicarrier system and having at least two VDSL systems, each including a pair of modems, the at least two VDSL systems belonging to a single binder group common to both VDSL systems, a method in the DMT system for keeping DMT frames aligned to the same frame timing includes estimating the time mis-alignment and power of cross-talk DMT signals added to a received DMT signal when the estimate is used by the modem to synchronize its own frame timing to a main cross-talkers frame timing, using auto-correlation on the received signal and a delayed copy of the received signal, and detecting correlation maxima that determine the frame boundaries of different DMT components of the received signal.

11 Claims, 4 Drawing Sheets

METHOD FOR ESTIMATING AND SYNCHRONIZING FRAME BOUNDARIES OF MIS-ALIGNED CROSS-TALK SIGNALS IN A DMT SYSTEM

FIELD OF THE INVENTION

A telecommunications transmission system using a DTM system as multicarrier system and having at least two VDSL systems, each comprising a pair of modems, said at least two VDSL systems belonging to a single binder group common to both VDSL systems, a method in said DMT system for keeping DMT frames aligned to the same frame timing.

BACKGROUND OF THE INVENTION

DMT is a multi-carrier technique standardised and well known for a man skilled in the art used for high bit-rate data transmission on twisted-pair lines, such as subscriber loops for telephony.

In U.S. Pat. No. 5,812,523 describes a method of demultiplexing OFDM signals and a receiver for such signals. More particularly the method is concerned with synchronization in an OFDM receiver. A signal is read into a synchronization unit, in the time domain, i.e., before fourier transforming the signal by means of an FFT processor. In the synchronization unit, a frame clock is derived for triggering the start of the FFT process and for controlling the rate at which data is supplied to the FFT processor. For OFDM reception, it is vital that the FFT process commences at the right point in time. Once the frame clock has been recovered, a frequency error can be estimated by the synchronization unit The frequency error is used to control; an oscillator which generates a complex rotating vector which is, in turn, multiplied with the signal to compensate for frequency errors. The method can be used both with OFDM systems in which symbols are separated by guard spaces, and with OFDM systems in which symbols are pulse shaped. Our invention have put in to practice a new method which is partly based on this earlier known method.

One problem that is always present is the signal cross-talk between pairs located in the same cable bundle. The cross-talk is usually described as two components, NEXT and FEXT. NEXT (Near End X-Talk) is the interference from other transmitters in the same end as the receiver. FEXT (Far End X-Talk) is the interference from other transmitters in the opposite end of the line.

DMT is a digital transmission technology relying on the orthogonality between carriers. The up-stream and downstream transmission is done on separate sets of carriers. Thus, NEXT is associated with transmission in the opposite direction and FEXT with transmission in the same direction as the received data. NEXT is usually the strongest interference signal, since it is generated close to a receiver that is receiving a weak signal.

The orthogonality is the best means to reduce the influence of NEXT. As long as the DMT frames are aligned to the same frame timing, the orthogonality holds and adjacent carriers can be used for different transmission directions without any capacity loss due to NEXT. This synchronisation has been posed as a problem for operators to implement, especially in an "unbundled" environment, where different operators share the same cable bundles.

SUMMARY OF THE INVENTION

In accordance with the invention the solution is what is stated in the claims.

The new technique in this invention is a step towards the synchronized DMT, again allowing the use of adjacent carriers without any NEXT influence and the full capacity of the synchronized DMT. It is an adaptive timing technique that is easy to implement and does not need any extra communication between modems or between operators' installations.

BRIEF DESCRIPTION OF THE DRAWINGS

The foregoing and other features of the present invention will be better understood from the following description with reference to the accompanying drawings, in which.

DETAILED DESCRIPTION

In order to facilitate an understanding of the present invention a glossary of terms used in this patent specification is provided below:

| | | |
|---|---|---|
| VDSL | - - - | Very high rate Digital Subscriber Line |
| NEXT | - - - | Near End crosstalk |
| FEXT | - - - | Far End crosstalk |
| DMT | - - - | Discrete Multitone, a multicarrier system using Discrete Fourier Transforms to create and demodulate individual carriers. |

Figure 1:
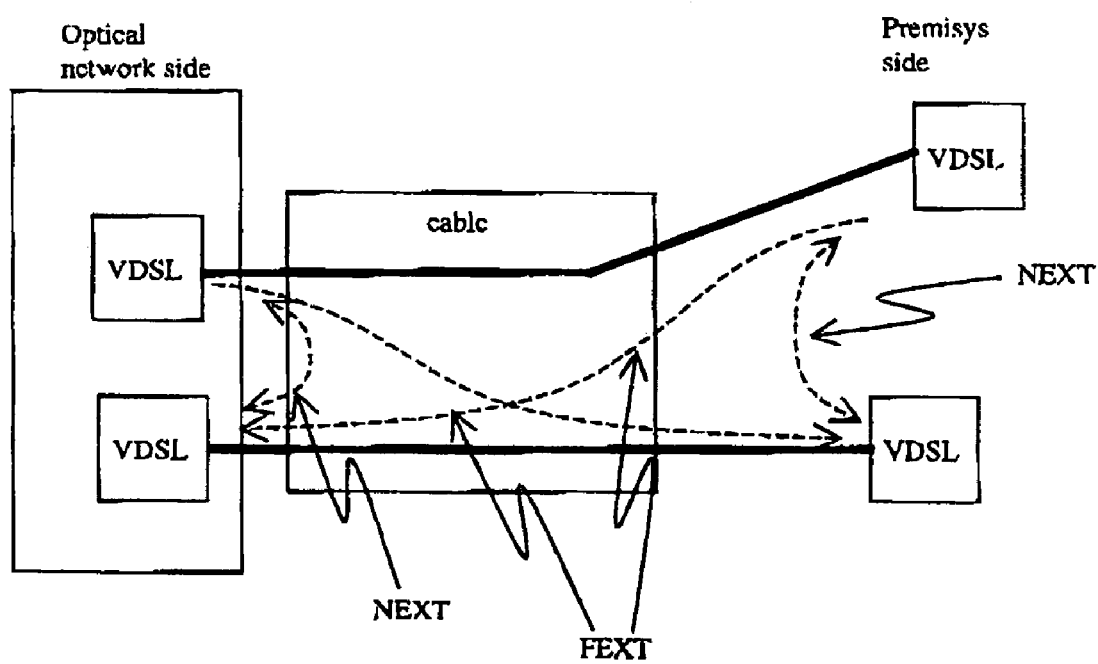
FIG. 1 illustrates, in schematic form, two VDSL systems operating in the same cable with corresponding NEXT and FEXT cross-talk.

Turning first to FIG. 1 there is illustrated a principal drawing of a situation where two VDSL systems operating in the same cable with corresponding NEXT and FEXT cross-talk. Fibre cables (not shown) feeding neighbourhood Optical Network Units (ONUs) and last leg premises connections by existing or new copper. VDSL transmits high-speed data over short reaches of twisted-pair copper telephone lines, with a range of speeds depending upon actual line length. VDSL is also a type of modem technology, enabling high-speed delivery of data, audio, and video in a digital form over the existing telephone infrastructure (copper twisted-pair phone lines called the local loop) which connects the customer premises and the carrier's central office. The basic idea behind all VDSL technology is that a special modem is attached to each end of the copper phone line, i.e. one modem at the customer premises and another one at the central office. The phone line is then exploited with the help of modulating techniques. In our invention we use Discrete Multi-Tone (DTM) as the multi-carrier modulating technology.

However is there always signal cross-talk between pairs located in the same cable bundle.

There are bascially two different forms of crosstalk in neighbouring copper pairs in the same cable: near-end crosstalk (NEXT) and far-end crosstalk (FEXT). NEXT is usually the strongest interference signal and occurs at the central office (base station)/optical network side when the weak upstream signal, is disturbed by strong downstream signals FEXT is crosstalk from one transmitted signal to another in the same direction and appears at the opposite end of the line, which is the premise side.

Figure 2:
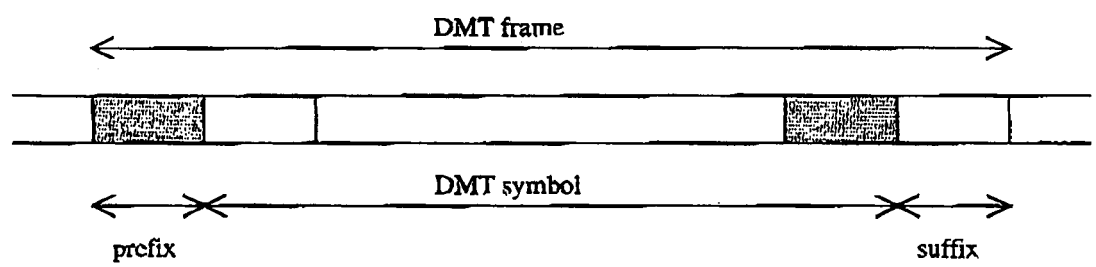
FIG. 2 illustrates, in schematic form, an DMT time-domain frame format.

DMT is our transmission technology, which is well known for a man skilled in the art. Turning now to FIG. 2 there is shown the frame format of the time-domain DMT signal. The symbol itself is extended by a cyclic extension (prefix and suffix). Shaping of the outer parts of the extension is used to reduce the out-of-band interference caused by the transmitter.

The extension is created as copies of parts of the DMT symbol, as shown in FIG. 2. Therefore, there is a strong correlation between parts of the time-domain signal built into the frame. The correlation of the time-domain signal by a delayed copy will then show peaks when a certain part of the frame passes the receiver. Due to the small piece of the frame length that is used for the correlation, only relatively strong signals will be clearly distinguishable. However, these are the only cross-talk signals that will cause any serious problems for the receiver. Averaging by using several frames in the correlation estimation will improve the quality of the estimate.

The invention uses the inherent property of DMT signals and that part of the signal is correlated in terms of cyclic extensions.

Figure 3:
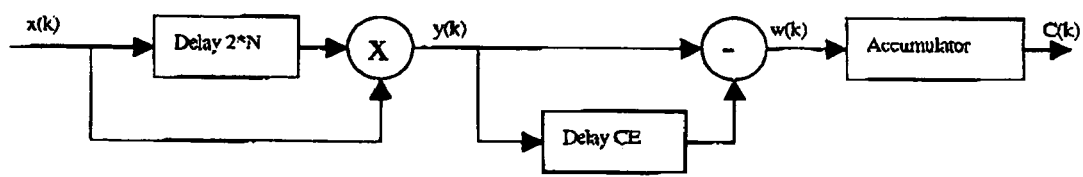
FIG. 3 illustrates, in schematic form, an Correlator block diagram.

Via auto-correlation on the received time-domain DMT signal the time mis-alignment of cross-talkers can be estimated using the correlator shown in FIG. 3.

In FIG. 3 the received sampled DMT signal, x(k), is the sum of the signal that is transmitted from the opposite end of the line and cross-talk signals that originate from other DMT signals transmitted on neighbouring pairs in the same cable.

The received signal x(k) is divided into two branches. One of the branches delays the signal by 2N samples corresponding to the length of one DMT symbol. A new signal, y(k), is then created as the product of the two signals x(k) and x(k−2*N). The signal y(k) is divided into two branches whereas one branch delays the signal CE samples, corresponding to the length of the total cyclic extension of the DMT frame. A new signal, w(k), is created as the difference y(k)−y(k−CE). The signal, w(k), is finally fed into an accumulator unit to create the correlation signal c(k).

The implementation of the correlation algorithm will be substantially simplified by using only the sign bit of the input signal X(k).

Figure 4:
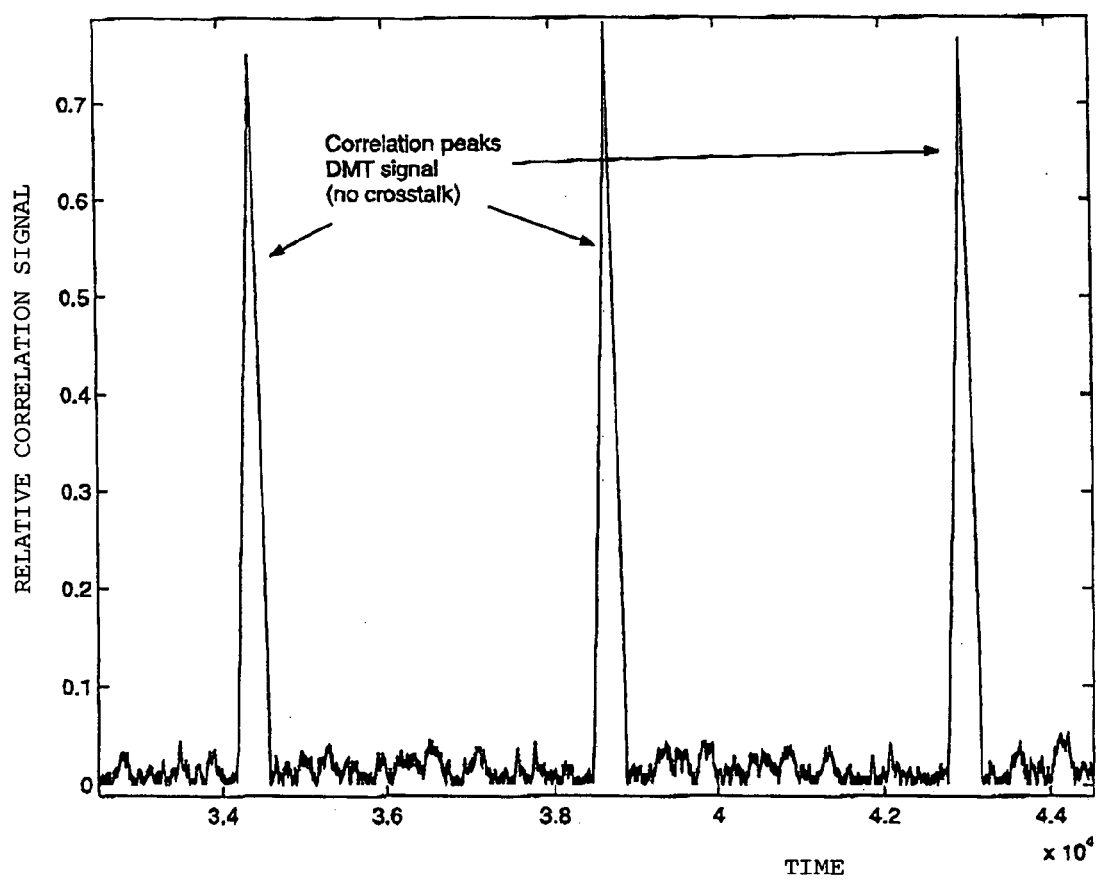
FIG. 4 illustrates, in schematic form, an DMT frame correlation without cross-talk.

If there are no cross-talkers present, the correlation sequence c(k) will have the principal shape as depicted in FIG. 4.

Figure 5:
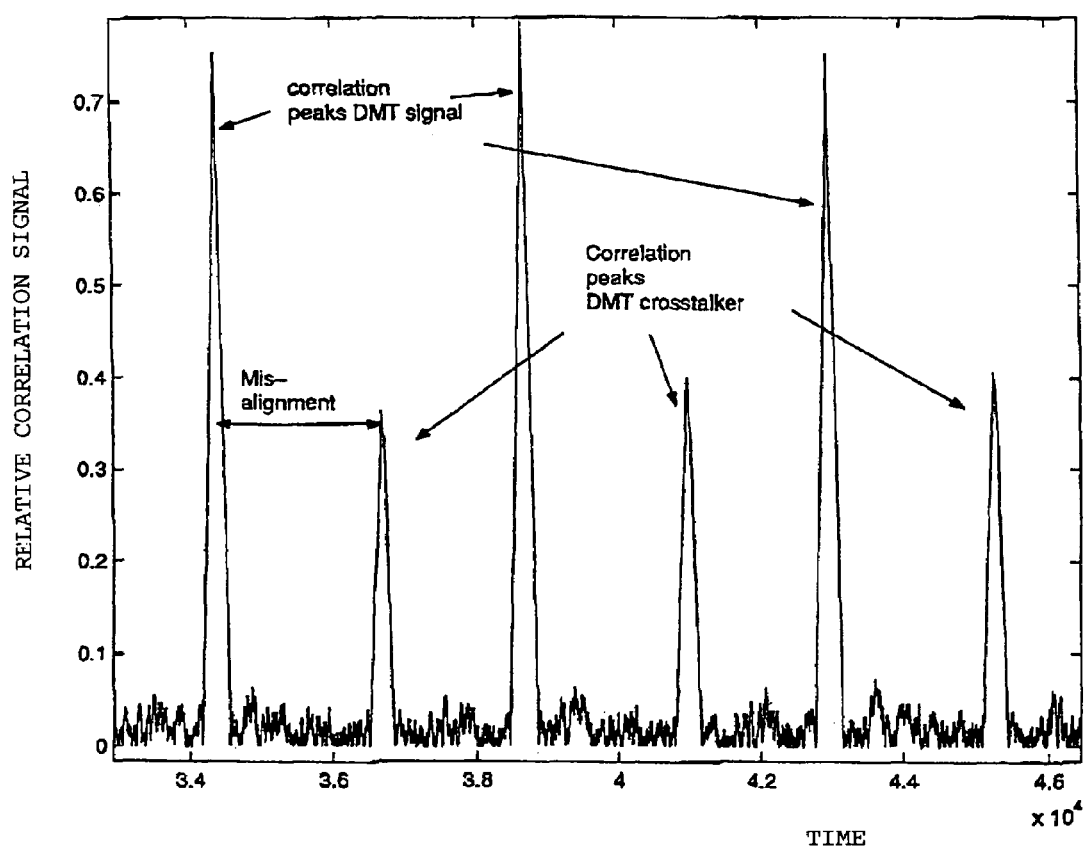
FIG. 5 illustrates, in schematic form, an Cross correlation of DMT signal with DMT cross-talker at a 3 dB lower power.

If, however, there are DMT cross-talk signals added to the signal, they will contribute to the auto-correlation with the same kind of correlation peaks located according to the frame timing. If the individual signals are uncorrelated, the correlation of a sum of signals equals the sum of the correlations of the individual signals. If the DMT receiver has knowledge of its own frame boundaries, it can easily determine which correlation peaks correspond to the desired signal and the cross-talk signals, respectively. An example is shown by FIG. 5.

The time shift of the correlation peaks of the cross-talkers is a measure of the time misalignment relative to the desired signal. The amplitude of each cross-talk peak is a relative measure of the power of the cross-talker.

At start-up the receiver makes a correlation on the signal including the cross-talkers. Assuming that all cross-talkers are aligned to common frame timing, they will all have their correlation peaks located in a small range of time. The starting-up modem, therefore, should use the correlation information to align its own frame timing to the cross-talkers. If every starting-up modem uses this method, all modems that cause interference in each other's receivers will become aligned to the same frame timing. The method estimating the time mis-alignment and power of cross-talk DMT signals added to a received DMT signal when the estimate is used by the modem to synchronise its own frame timing to a main cross-talkers frame timing. Auto-correlation is used on the received signal and a delayed copy of the received signal. Correlation maxima detects that determine the frame boundaries of different DMT components of the received signal.

It is important to mention that the method uses the inherent property of DMT signals and that part of the signal is correlated, in the time domain, in terms of cyclic extensions. The method further comprising the step that the time mis-alignment, which illustrates in FIG. 5, of the cross-talk signals estimates as the distance between the correlation maximum corresponding to the desired signal (known location) and other correlation maxima.

As can bee seen in FIG. 5 amplitude of a correlation maximum is a relative measure of the power of the corresponding cross-talker.

The method further comprising the step that when the time offset of the cross-talk is estimated at the VTU-O, this information will be used to adjust its clock and frame boundaries to align with the cross-talker and hence orthogonality is achieved and the distortion is minimized.

The method further comprising the step that if the auto-correlation peak amplitude of the cross-talk signal is low the VTU-O can choose to not align clock and frame boundaries since the cross-talker then do not significantly contribute to the distortion and hence a threshold level will be used.

We claim:

1. A method for keeping Discrete Multi Tone (DMT) frames aligned to a same frame timing, for use in a telecommunications transmission system using a DMT system as a multicarrier system and having at least two Very high rate Digital Subscriber Line (VDSL) systems, each comprising a pair of modems, said at least two VDSL systems belonging to a single binder group common to both VDSL systems, comprising the steps of:
    a) effecting a correlation between a received DMT signal comprising DMT symbols, each DMT symbol having cyclic extensions, and a delayed copy of the received DMT signal;
    b) detecting correlation maxima which determine the frame boundaries of different DMT cross-talk components of the received DMT signal;
    c) estimating the time misalignment from the correlation maxima; and
    d) using the estimate by the modem of the pair of modems to synchronize its own frame timing to a main cross-talkers frame timing.

2. A method, as claimed in claim 1 further comprising using an inherent property of the received DMT signal, wherein part of the signal is correlated, in the time domain, in terms of cyclic extensions.

3. A method, as claimed in claim 1 further comprising estimating the time misalignment of cross-talk components of cross-talkers from the distance between the correlation maximum corresponding to a desired signal and other correlation maxima.

4. A method, as claimed in claim 3 further comprising the step of estimating the relative power of a corresponding cross-talker from the amplitude of a correlation maximum.

5. A method, as claimed in claim 3 further comprising the step of, when a time offset of cross-talk components of a cross-talker is estimated at a VDSL Transceiver Unit-Optical Network Unit (VTU-O), using the time offset is used to adjust its clock and frame boundaries to align with the cross-talker so that orthogonality is achieved and distortion is minimized.

6. A method, as claimed in claim 3 further comprising the step of, when if an auto-correlation peak amplitude of a cross-talk component of a cross-talker is low, a VDSL Transceiver Unit-Optical Network Unit (VTU-O) choosing to not align its clock and frame boundaries since the cross-talker then does not significantly contribute to distortion and hence a threshold level is used.

7. A method, as claimed in claim 1 wherein the method is used for applications including Near End Cross-Talk (NEXT) cancellation algorithms and multi-user detection algorithms.

8. A method, as claimed in claim 1 wherein, when the method is used in every starting-up modem in the telecommunications transmission system, modems that cause interference in each other's receivers become aligned to the same frame timing.

9. In a communication system having a transmission channel, a method comprising the steps of:
   a) receiving a carrier signal on the transmission channel, wherein the carrier signal is part of a Discrete Multi Tone (DMT) modulated carrier signal, wherein the DMT modulated carrier signal includes cyclic extensions, and wherein the cyclic extensions include a cyclic prefix appended to the beginning of the DMT modulated carrier signal and a cyclic suffix appended to the end of the DMT modulated carrier signal;
   b) applying an autocorrelation function to the carrier signal to generate a correlation signal, further comprising applying an autocorrelation function to the DMT modulated carrier signal using a delayed copy of the DMT modulated carrier signal in order to correlate the cyclic extensions of the DMT modulated carrier signal;
   c) detecting correlation maxima of the carrier signal and correlation maxima of a crosstalk signal in the correlation signal;
   d) determining a time misalignment between the carrier signal and the crosstalk signal based on a time shift of the correlation maxima of the carrier signal and the crosstalk signal; and
   e) adjusting a frame timing of the carrier signal based on the time misalignment.

10. In a Very high bit rate Digital Subscriber Line (VDSL) communications system comprising a plurality of modem pairs, each modem pair including a first VDSL modem and a second VDSL modem, a method comprising:
   a) using the first VDSL modem of a first modem pair of the plurality of modem pairs to send a first discrete multitone (DMT) signal over a first transmission channel in a cable;
   b) using the first VDSL modem of a second modem pair of the plurality of modem pairs to send a second DMT signal over a second transmission channel in the cable, wherein each DMT signal includes a DMT modulated carrier signal, wherein the DMT modulated carrier signal includes cyclic extensions, and wherein the cyclic extensions include a cyclic prefix appended to the beginning of the DMT modulated carrier signal and a cyclic suffix appended to the end of the DMT modulated carrier signal;
   c) using the second VDSL modem of the first modem pair of the plurality of modem pairs to receive the first DMT signal on the first transmission channel, the first DMT signal including a crosstalk from the second DMT signal;
   d) applying an autocorrelation function to the first DMT signal to generate a correlation signal, further comprising applying the autocorrelation function to the DMT modulated carrier signal using a delayed copy of the DMT modulated carrier signal in order to correlate the cyclic extensions of the DMT modulated carrier signal;
   e) detecting, in the correlation signal, correlation maxima of the first DMT signal and correlation maxima of the crosstalk from the second DMT signal;
   f) determining a time misalignment between the first DMT signal and the crosstalk from the second DMT signal based on a time shift of the correlation maxima of the first DMT signal and the correlation maxima of the crosstalk from the second DMT signal; and
   g) adjusting a frame timing of the first modem of the first modem pair of the plurality of modem pairs based on the time misalignment.

11. In a communication system having a transmission channel, an apparatus comprising:
   a) means for receiving a carrier signal on the transmission channel, wherein the carrier signal is part of a Discrete Multi Tone (DMT) modulated carrier signal, wherein the DMT modulated carrier signal includes cyclic extensions, and wherein the cyclic extensions include a cyclic prefix appended to the beginning of the DMT modulated carrier signal and a cyclic suffix appended to the end of the DMT modulated carrier signal;
   b) means for applying an autocorrelation function to the carrier signal to generate a correlation signal, further comprising means for applying the autocorrelation function to the DMT modulated carrier signal using a delayed copy of the DMT modulated carrier signal in order to correlate the cyclic extensions of the DMT modulated carrier signal;
   c) means for detecting correlation maxima of the carrier signal and correlation maxima of a crosstalk signal in the correlation signal;
   d) means for determining a time misalignment between the carrier signal and the crosstalk signal based on a time shift of the correlation maxima of the carrier signal and the crosstalk signal; and
   e) means for adjusting a frame timing of the carrier signal based on the time misalignment.

* * * * *

UNITED STATES PATENT AND TRADEMARK OFFICE
CERTIFICATE OF CORRECTION

| | |
|---|---|
| PATENT NO. | : 6,993,068 B1 |
| DATED | : January 31, 2006 |
| INVENTOR(S) | : Mikael Isaksson, Lennart Olsson and Denis Julien Gilles Mestdagh |

It is certified that error appears in the above-identified patent and that said Letters Patent is hereby corrected as shown below:

Column 5,
Line 10, should read -- Network Unit (VTU-O), using the time offset is --.
Line 15, should read -- step of, when an auto-correlation peak amplitude of a --.

Column 6,
Line 12, should read -- of the plurality of modern pairs to receive the first DMT --.
Line 32, should read -- modem pair of the plurality of modem pairs based on --.

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,993,068 B1 | Page 1 of 1 |
| APPLICATION NO. | : 09/686031 | |
| DATED | : January 31, 2006 | |
| INVENTOR(S) | : Mikael Isaksson, Lennart Olsson and Denis Julien Gilles Mestdagh | |

It is certified that error appears in the above-identified patent and that said Letters Patent is hereby corrected as shown below:

Column 5,
Line 10, should read -- Network Unit (VTU-O), using the time offset is --.
Line 15, should read -- step of, when an auto-correlation peak amplitude of a --.

Column 6,
Line 12, should read -- of the first modem pair of the plurality of modem pairs to receive the first DMT --.
Line 32, should read -- modem pair of the plurality of modem pairs based on --.

This certificate supersedes the Certificate of Correction issued April 4, 2006.

Signed and Sealed this
Ninth Day of October, 2012

David J. Kappos
*Director of the United States Patent and Trademark Office*